(12) United States Patent
Lee

(10) Patent No.: US 12,602,555 B2
(45) Date of Patent: Apr. 14, 2026

(54) METHOD FOR SEARCHING FOR TEXTS IN DIFFERENT LANGUAGES BASED ON PRONUNCIATION AND ELECTRONIC DEVICE APPLYING THE SAME

(71) Applicant: SAMSUNG ELECTRONICS CO., LTD., Suwon-si (KR)

(72) Inventor: Jeongpyo Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 387 days.

(21) Appl. No.: 18/095,894

(22) Filed: Jan. 11, 2023

(65) Prior Publication Data

US 2023/0237283 A1 Jul. 27, 2023

Related U.S. Application Data

(63) Continuation of application No. PCT/KR2022/020798, filed on Dec. 20, 2022.

(30) Foreign Application Priority Data

Jan. 11, 2022 (KR) ........................ 10-2022-0004201
Apr. 14, 2022 (KR) ........................ 10-2022-0046238

(51) Int. Cl.
*G06F 40/58* (2020.01)
*G06F 40/263* (2020.01)

(52) U.S. Cl.
CPC ............ *G06F 40/58* (2020.01); *G06F 40/263* (2020.01)

(58) Field of Classification Search
CPC ................................ G06F 40/58; G06F 40/263
See application file for complete search history.

(56) References Cited

U.S. PATENT DOCUMENTS 6,963,871 B1 * 11/2005 Hermansen ....... G06F 16/90344
707/E17.061
7,328,211 B2 2/2008 Bordner et al.
(Continued)

FOREIGN PATENT DOCUMENTS

CN     106570001 B  * 10/2018  ........... G06F 40/247
CN     109359303 A  *  2/2019  ............. G06F 40/30
(Continued)

OTHER PUBLICATIONS

English Translation of CN-106570001-B (Year: 2018).*
(Continued)

*Primary Examiner* — Daniel C Washburn
(74) *Attorney, Agent, or Firm* — CANTOR COLBURN LLP

(57) ABSTRACT

An electronic device may identify a language of an input text string, convert the input text string into a standard text string based on the language of the input text string and a standard conversion table, convert the standard text string into a code string, generate a plurality of first vectors based on an order of codes included in the code string and two consecutive codes included in the code string, compare the plurality of first vectors with a plurality of index vectors and identify a plurality of second vectors having a similarity, which is greater than or equal to a threshold, and provide an output text string corresponding to the plurality of second vectors. The language of the input text string may be different from a language of the output text string. Pronunciation of the input text string may correspond to pronunciation of the output text string.

18 Claims, 12 Drawing Sheets

(56) References Cited

U.S. PATENT DOCUMENTS

| | | | | |
|---|---|---|---|---|
| 7,643,985 | B2 | 1/2010 | Horvitz | |
| 8,433,557 | B2 * | 4/2013 | Alghamdi | G09B 19/08 |
| | | | | 704/4 |
| 8,554,537 | B2 * | 10/2013 | Rai | G06F 40/53 |
| | | | | 704/8 |
| 8,612,206 | B2 * | 12/2013 | Chalabi | G06F 40/53 |
| | | | | 704/8 |
| 8,812,300 | B2 * | 8/2014 | Gillam | G06F 16/90344 |
| | | | | 704/4 |
| 9,824,139 | B2 | 11/2017 | Lim et al. | |
| 10,956,466 | B2 * | 3/2021 | Upadhyay | G06F 40/53 |
| 11,062,621 | B2 * | 7/2021 | Upadhyay | G06N 20/00 |
| 2005/0119875 | A1 * | 6/2005 | Shaefer | G06F 16/334 |
| | | | | 704/7 |
| 2008/0133522 | A1 | 6/2008 | Bordner et al. | |
| 2010/0211376 | A1 | 8/2010 | Chen et al. | |
| 2017/0177566 | A1 * | 6/2017 | Huck | G06F 40/47 |
| 2019/0354689 | A1 * | 11/2019 | Li | G06N 3/045 |
| 2021/0233510 | A1 * | 7/2021 | Datta | G10L 15/063 |
| 2021/0366460 | A1 * | 11/2021 | Perucci | G10L 13/08 |
| 2022/0382999 | A1 * | 12/2022 | Gunasekara | G10L 15/142 |

FOREIGN PATENT DOCUMENTS

| | | | | |
|---|---|---|---|---|
| KR | 20070064900 | A | 6/2007 | |
| KR | 20080019209 | A | 3/2008 | |
| KR | 20090024460 | A | 3/2009 | |
| KR | 20090060631 | A | 6/2009 | |
| KR | 101282419 | B1 * | 7/2013 | |
| KR | 102062524 | B1 | 1/2020 | |
| KR | 20200088263 | A | 7/2020 | |
| TW | M619103 | U * | 11/2021 | G06F 40/30 |

OTHER PUBLICATIONS

English Translation of KR-101282419-B1 (Year: 2013).*
International Search Report and Written Opinion for International Application No. PCT/KR2022/020798; International Filing Date Dec. 20, 2022; Date of Mailing Mar. 24, 2023; 10 Pages.

* cited by examiner

100

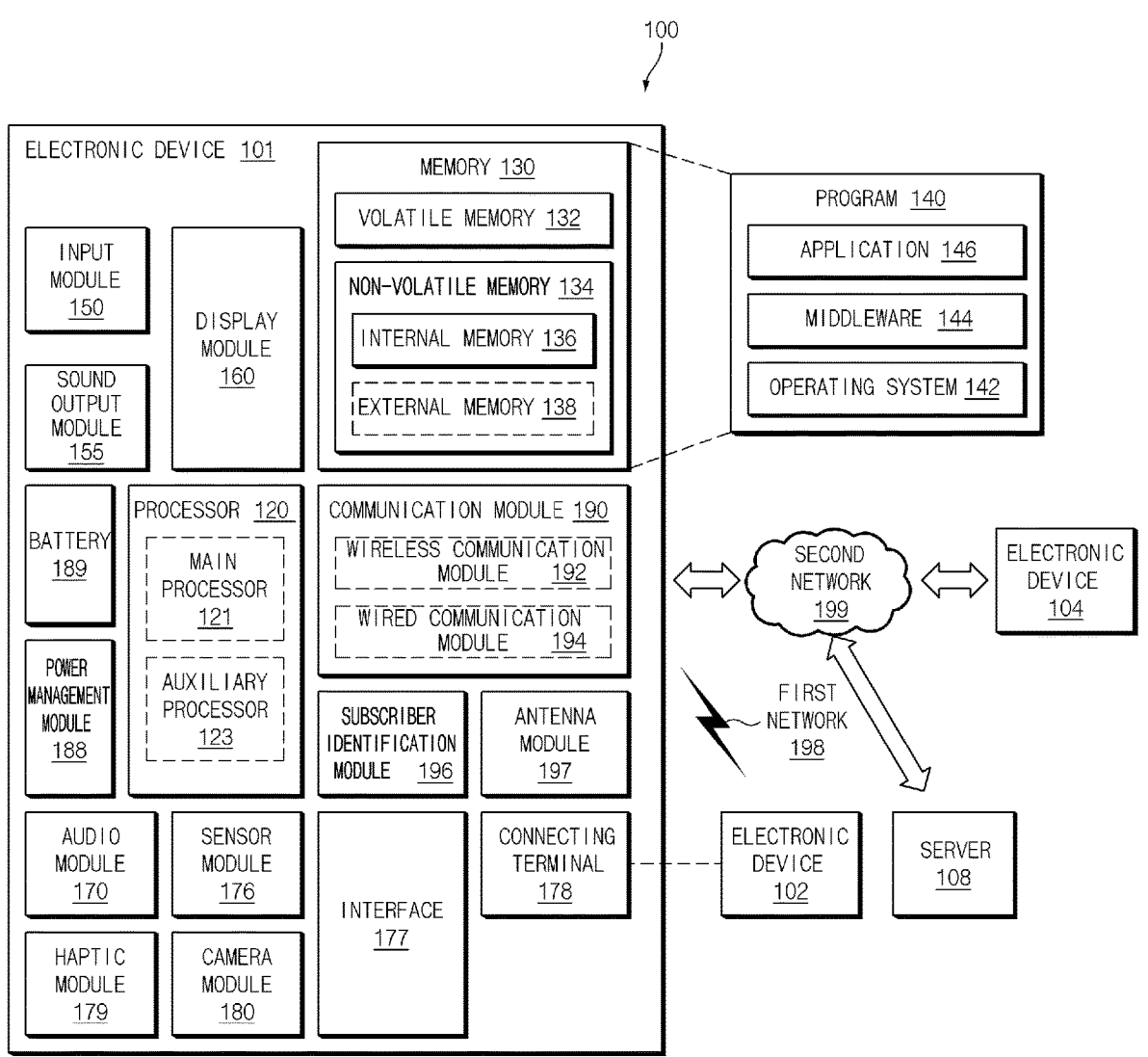

ELECTRONIC DEVICE 101

MEMORY 130

VOLATILE MEMORY 132

NON-VOLATILE MEMORY 134

INTERNAL MEMORY 136

EXTERNAL MEMORY 138

INPUT MODULE 150

DISPLAY MODULE 160

SOUND OUTPUT MODULE 155

BATTERY 189

POWER MANAGEMENT MODULE 188

PROCESSOR 120

MAIN PROCESSOR 121

AUXILIARY PROCESSOR 123

COMMUNICATION MODULE 190

WIRELESS COMMUNICATION MODULE 192

WIRED COMMUNICATION MODULE 194

SUBSCRIBER IDENTIFICATION MODULE 196

ANTENNA MODULE 197

AUDIO MODULE 170

SENSOR MODULE 176

HAPTIC MODULE 179

CAMERA MODULE 180

INTERFACE 177

CONNECTING TERMINAL 178

PROGRAM 140

APPLICATION 146

MIDDLEWARE 144

OPERATING SYSTEM 142

SECOND NETWORK 199

ELECTRONIC DEVICE 104

FIRST NETWORK 198

ELECTRONIC DEVICE 102

SERVER 108

| CODE STRING | VECTOR GENERATION MODULE | PLURALITY OF FIRST VECTORS |
|---|---|---|
| 510 | 280 | 610 |

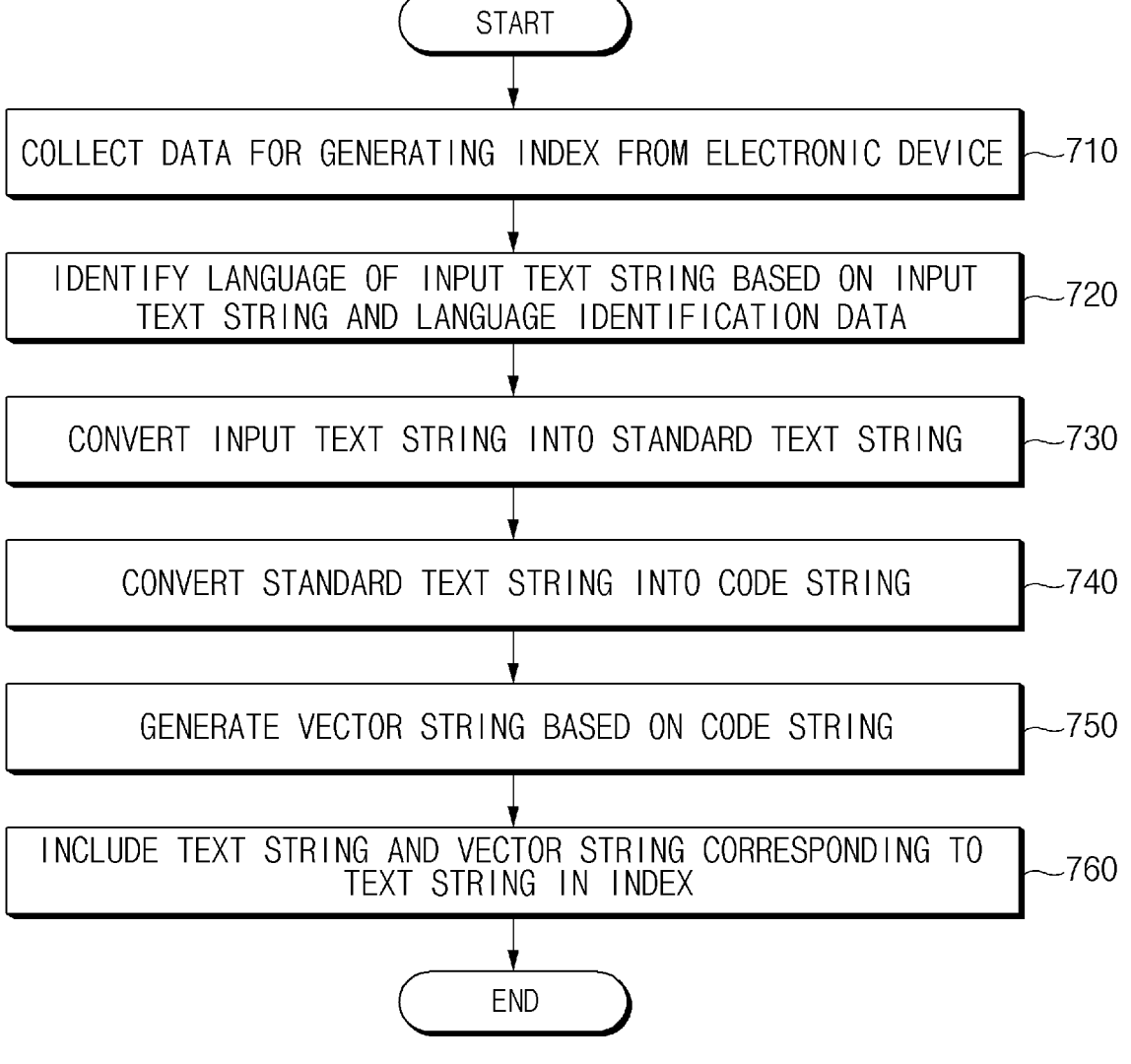

START

COLLECT DATA FOR GENERATING INDEX FROM ELECTRONIC DEVICE ~710

IDENTIFY LANGUAGE OF INPUT TEXT STRING BASED ON INPUT
TEXT STRING AND LANGUAGE IDENTIFICATION DATA ~720

CONVERT INPUT TEXT STRING INTO STANDARD TEXT STRING ~730

CONVERT STANDARD TEXT STRING INTO CODE STRING ~740

GENERATE VECTOR STRING BASED ON CODE STRING ~750

INCLUDE TEXT STRING AND VECTOR STRING CORRESPONDING TO
TEXT STRING IN INDEX ~760

END

FIG.7

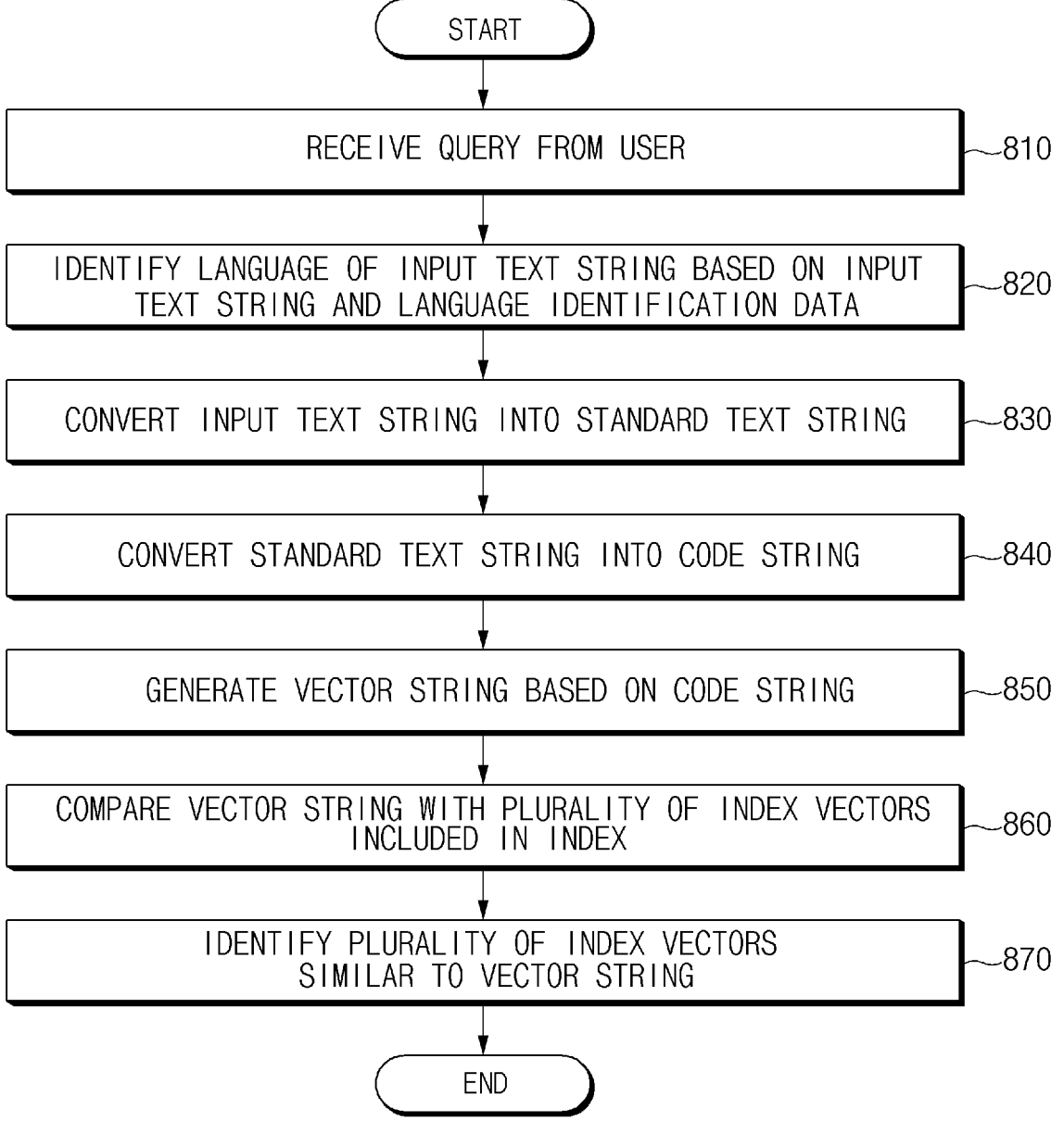

START

RECEIVE QUERY FROM USER ~810

IDENTIFY LANGUAGE OF INPUT TEXT STRING BASED ON INPUT TEXT STRING AND LANGUAGE IDENTIFICATION DATA ~820

CONVERT INPUT TEXT STRING INTO STANDARD TEXT STRING ~830

CONVERT STANDARD TEXT STRING INTO CODE STRING ~840

GENERATE VECTOR STRING BASED ON CODE STRING ~850

COMPARE VECTOR STRING WITH PLURALITY OF INDEX VECTORS INCLUDED IN INDEX ~860

IDENTIFY PLURALITY OF INDEX VECTORS SIMILAR TO VECTOR STRING ~870

END

FIG.8

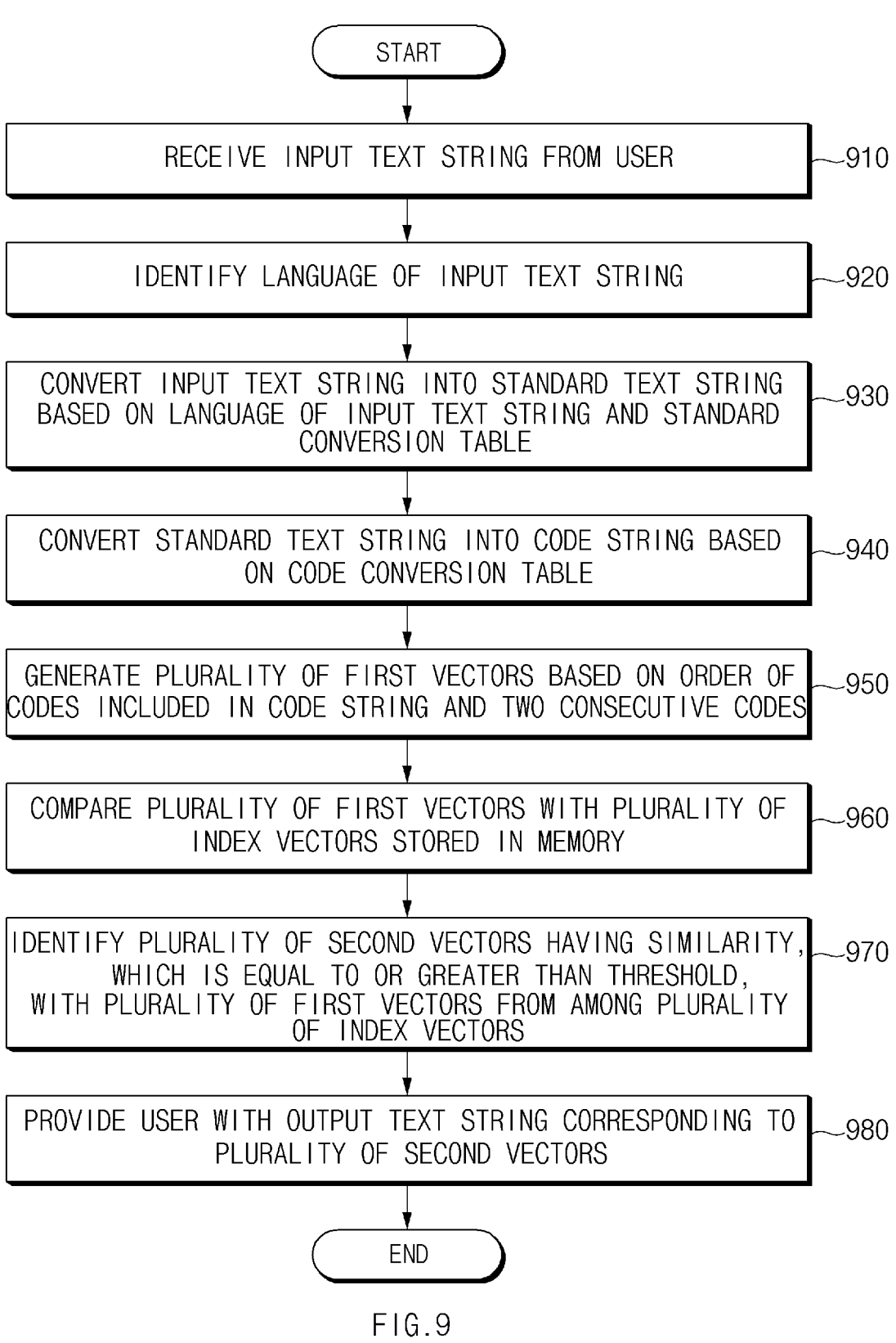

START

RECEIVE INPUT TEXT STRING FROM USER ~910

IDENTIFY LANGUAGE OF INPUT TEXT STRING ~920

CONVERT INPUT TEXT STRING INTO STANDARD TEXT STRING BASED ON LANGUAGE OF INPUT TEXT STRING AND STANDARD CONVERSION TABLE ~930

CONVERT STANDARD TEXT STRING INTO CODE STRING BASED ON CODE CONVERSION TABLE ~940

GENERATE PLURALITY OF FIRST VECTORS BASED ON ORDER OF CODES INCLUDED IN CODE STRING AND TWO CONSECUTIVE CODES ~950

COMPARE PLURALITY OF FIRST VECTORS WITH PLURALITY OF INDEX VECTORS STORED IN MEMORY ~960

IDENTIFY PLURALITY OF SECOND VECTORS HAVING SIMILARITY, WHICH IS EQUAL TO OR GREATER THAN THRESHOLD, WITH PLURALITY OF FIRST VECTORS FROM AMONG PLURALITY OF INDEX VECTORS ~970

PROVIDE USER WITH OUTPUT TEXT STRING CORRESPONDING TO PLURALITY OF SECOND VECTORS ~980

END

FIG.9

METHOD FOR SEARCHING FOR TEXTS IN DIFFERENT LANGUAGES BASED ON PRONUNCIATION AND ELECTRONIC DEVICE APPLYING THE SAME

CROSS-REFERENCE TO RELATED APPLICATION(S)

This application is a continuation application, claiming priority under § 365 (c), of an International Application No. PCT/KR2022/020798, filed on Dec. 20, 2022, which is based on and claims the benefit of a Korean patent application number 10-2022-0046238, filed on Apr. 14, 2022, in the Korean Intellectual Property Office, and of a Korean patent application number 10-2022-0004201, filed on Jan. 11, 2022, in the Korean Intellectual Property Office, the disclosure of each of which is incorporated by reference herein in its entirety.

BACKGROUND

Field

Various embodiments disclosed in this specification relate to a method for searching for a text in different languages based on pronunciation and an electronic device applying the same.

Description of Related Art

Some electronic devices provide a user with a method of searching for a text in different languages. The user may search for a text in different languages by using text information, such as meaning or sound of the text.

In searching for the text in different languages, when there is a plurality of languages used to search for a text, there may be a need for the corresponding notation method or converter for each language pair. For example, when a similar pronunciation search of a text is performed on three languages, three methods or three converters may be required. When a similar pronunciation search of a text is performed on four languages, six methods or six converters may be required.

SUMMARY

Embodiments, as further described herein, provide a general and efficient method of searching for a text in different languages, in searching for a text in different languages based on a change in pronunciation of the text.

According to an embodiment disclosed in this specification, an electronic device includes a memory and a processor connected to the memory. The memory stores instructions that, when executed, cause the processor to identify a language of an input text string received from a user, to convert the input text string into a standard text string based on the language of the input text string and a standard conversion table, to convert the standard text string into a code string based on a code conversion table, to generate a plurality of first vectors based on an order of codes included in the code string and two consecutive codes included in the code string, to compare the plurality of first vectors with a plurality of index vectors stored in the memory, to identify a plurality of second vectors having a similarity, which is greater than or equal to a threshold, with the plurality of first vectors from among the plurality of index vectors based on the comparison, and to provide the user with an output text string corresponding to the plurality of second vectors. The language of the input text string may be different from a language of the output text string. Pronunciation of the input text string may correspond to pronunciation of the output text string.

Moreover, according to an embodiment disclosed in this specification, a method of searching for a text in different languages based on pronunciation, performed by an electronic device, includes identifying a language of an input text string received from a user, converting the input text string into a standard text string based on the language of the input text string and a standard conversion table, converting the standard text string into a code string based on a code translation table, generating a plurality of first vectors based on an order of codes included in the code string and two consecutive codes included in the code string, comparing the plurality of first vectors with a plurality of index vectors stored in a memory of the electronic device, identifying a plurality of second vectors having a similarity, which is greater than or equal to a threshold, with the plurality of first vectors from among the plurality of index vectors based on the comparison, and providing the user with an output text string corresponding to the plurality of second vectors. The language of the input text string may be different from a language of the output text string. Pronunciation of the input text string may correspond to pronunciation of the output text string.

Further, according to an embodiment disclosed in this specification, a computer program product stored on a machine-readable storage medium includes instructions that, when executed, cause a processor of an electronic device to identify a language of an input text string received from a user, to convert the input text string into a standard text string based on the language of the input text string and a standard conversion table, to convert the standard text string into a code string based on a code conversion table, to generate a plurality of first vectors based on an order of codes included in the code string and two consecutive codes included in the code string, to compare the plurality of first vectors with a plurality of index vectors stored in a memory of the electronic device, to identify a plurality of second vectors having a similarity, which is greater than or equal to a threshold, with the plurality of first vectors from among the plurality of index vectors based on the comparison, and to provide the user with an output text string corresponding to the plurality of second vectors. The language of the input text string may be different from a language of the output text string. Pronunciation of the input text string may correspond to pronunciation of the output text string.

According to embodiments disclosed in this specification, an electronic device may search for a text having the same or similar pronunciation in languages different from a language in which the text is entered into the electronic device, based on a change in pronunciation of the text.

According to embodiments disclosed in this specification, an electronic device may analyze the language of the text entered into the electronic device based on data such as a setting language of the electronic device, a setting country of the electronic device, or location information of the electronic device. Accordingly, the electronic device may identify the target and/or meaning of each of the texts written in different languages. Each of the texts written in different languages may have the same character system (e.g., Roman characters).

According to embodiments disclosed in this specification, even though a user may not know a language of a text and the meaning of the text to be found, the user may search for the text by using pronunciation of the text and a language of the corresponding pronunciation.

A variety of effects directly or indirectly understood through the specification may be provided.

BRIEF DESCRIPTION OF THE DRAWINGS

FIG. 1 is a block diagram of an electronic device in a network environment, according to various embodiments.

FIG. 7 is a flowchart for performing an indexing operation, according to an embodiment disclosed in the specification.

FIG. 8 is a flowchart for performing a querying operation, according to an embodiment disclosed in the specification.

FIG. 9 is a flowchart for performing a method disclosed in the specification.

Figure 2A:
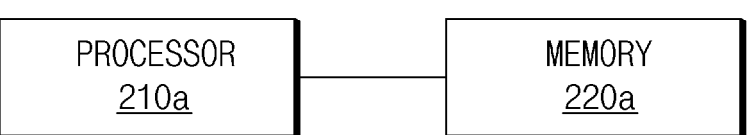
FIG. 2A is a block diagram illustrating an electronic device disclosed in the specification.

With regard to description of drawings, the same or similar components will be marked by the same or similar reference signs.

DETAILED DESCRIPTION

Hereinafter, various embodiments of the disclosure will be described with reference to accompanying drawings. However, those of ordinary skill in the art will recognize that modification, equivalent, and/or alternative on various embodiments described herein may be variously made without departing from the scope and spirit of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication a wireless communication. According embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2A is a block diagram of an electronic device disclosed in the specification.

According to an embodiment, an electronic device 200a (e.g., the electronic device 101 of FIG. 1) may include a processor 210a (e.g., the processor 120 of FIG. 1), and a memory 220a (e.g., the memory 130 of FIG. 1).

According to an embodiment, the memory 220a may store various data and/or information used in the electronic device 200a. The memory 220a may store instructions that, when executed by the processor 210a, cause the processor 210a to control an operation of the electronic device 200a. The memory 220a may at least temporarily store data used to perform an operation of the electronic device 200a.

According to an embodiment, the memory 220a may store a query. The query may include a text string (e.g., an input text string 310 of FIG. 3) entered by a user. The query may include a search request for a text string, which is written in a language different from that of the input text string 310, from among text strings, each of which is pronounced identically or similarly to an input text string 310.

According to an embodiment, the memory 220a may store a formatted query. The formatted query may have a format that allows the processor 210a to perform a series of operations based on the query.

Figure 2B:
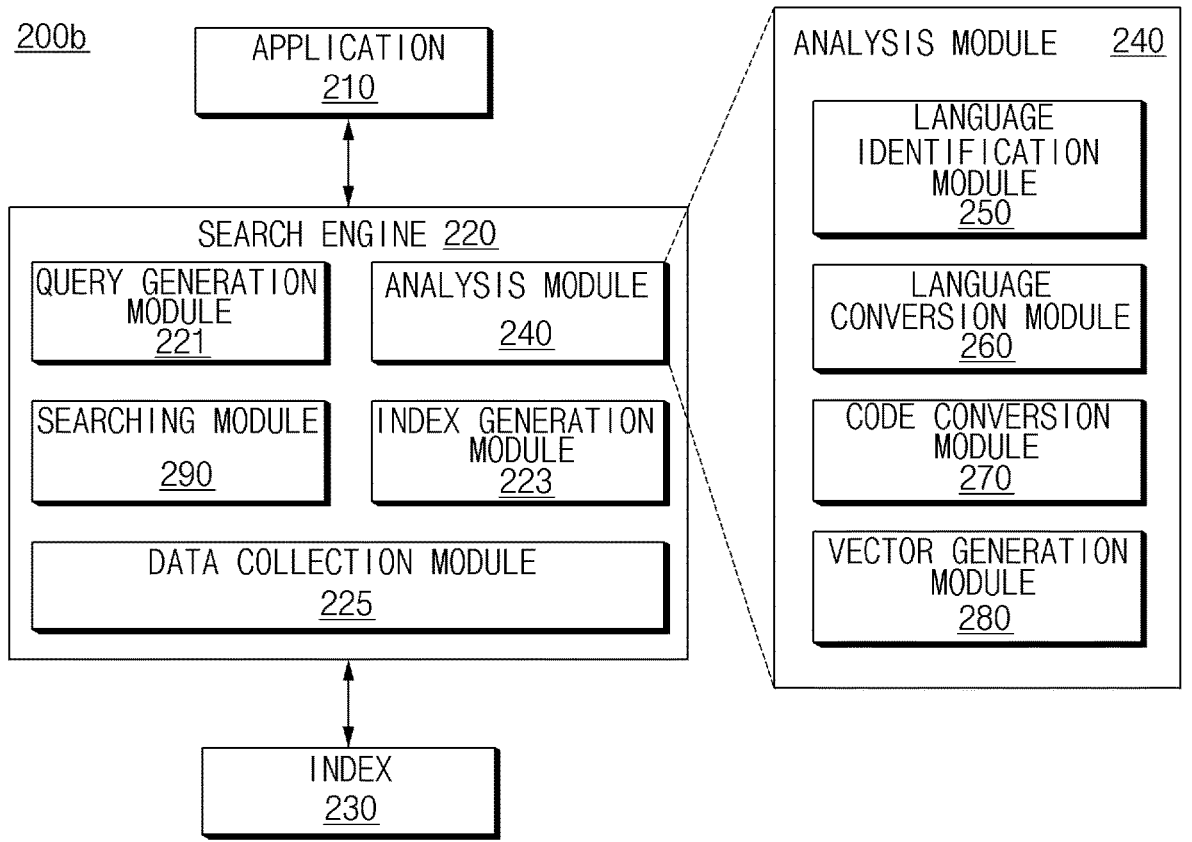
FIG. 2B is a block diagram illustrating components included in an electronic device disclosed in the specification.

According to an embodiment, the memory 220a may store an index (e.g., an index 230 in FIG. 2B). The index 230 may include a plurality of text strings. The plurality of text strings may be stored based on the same language and/or different languages. For example, the index 230 may include a plurality of vectors (e.g., a plurality of index vectors) respectively corresponding to the plurality of text strings.

According to an embodiment, the memory 220a may store data for generating the index 230. For example, the memory 220a may store at least one of contact data, image data, video data, application data, document data, and/or other data. For example, the memory 220a may store a text string based on data for generating the index 230, and a vector corresponding to the text string.

According to an embodiment, the memory 220a may store the input text string 310, an input text vector corresponding to the input text string 310, language identification data (e.g., a language identification data 320 of FIG. 3), a language identification vector corresponding to the language identification data 320, a input-text-string language (e.g., a language 330 of an input text string in FIG. 3 (hereinafter, referred to as an "input-text-string language" 330), and a probability corresponding to the input-text-string language 330. The memory 220a may store the probability corresponding to the input-text-string language 330 in a form of a scalar and/or a vector.

According to an embodiment, the memory 220a may store a standard text string (e.g., a standard text string 410 in FIG. 4A) corresponding to the input text string 310. The memory 220a may store a standard conversion table. The memory 220a may store a code string (e.g., a code string 510 of FIG. 5) corresponding to the standard text string 410. The memory 220a may store a code conversion table. The memory 220a may store a vector string (e.g., a plurality of first vectors 610 of FIG. 6) corresponding to the code string 510.

According to an embodiment, the processor 210a may collect data for generating the index 230 from the memory 220a. For example, the processor 210a may collect at least one of contact data, image data, video data, application data, document data, and/or other data as data for generating the index 230 from the memory 220a.

According to an embodiment, the processor 210a may generate the index 230 based on data for generating the index 230. The processor 210a may store data for generating the index 230 in the index 230 thus previously generated. The processor 210a may store a text string based on data for generating the index 230 and a vector corresponding to the text string in the index 230.

According to an embodiment, the processor 210a may receive a query from a user. The query may include the input text string 310. The query may include a search request for a text string, which is written in a language different from that of the input text string 310, from among text strings, each of which is pronounced identically or similarly to an input text string 310.

For example, when the user enters "Francesca", the query may include a search request for a text string written in a language other than 'Korean' among text strings having identical or similar pronunciation to the pronunciation of "Francesca".

According to an embodiment, the processor 210a may generate a formatted query based on the query. The formatted query may have a format that allows the processor 210a to perform a series of operations based on the query. For example, the series of operations may include an operation in which the processor 210a uses, processes, modifies, translates and/or deletes a query.

According to an embodiment, the processor 210a may search for the index 230 based on the formatted query. The processor 210a may generate a vector (e.g., the plurality of first vectors 610) corresponding to the input text string 310 based on the input text string 310 included in the formatted query. A method in which the processor 210a generates the plurality of first vectors 610 based on the input text string 310 will be described in detail below.

According to an embodiment, the processor 210a may identify the input-text-string language 330 based on the input text string 310 and the language identification data 320.

According to an embodiment, the processor 210a may generate an input text vector by converting the input text string 310 into a vector through a one hot encoding scheme.

According to an embodiment, the processor 210a may generate a language identification vector by converting content included in the language identification data 320 into a vector. When the language identification data 320 includes pieces of content, the processor 210a may generate a plurality of language identification vectors by converting each of the pieces of content into a vector.

According to an embodiment, the processor 210a may process an input value (e.g., an input text string vector and/or a language identification vector) based on a convolutional neural network (CNN) algorithm, a recurrent neural network (RNN) algorithm, or a feedforward neural network (FNN) algorithm.

According to an embodiment, the processor 210a may output a probability corresponding to the input-text-string language 330 in the form of a scalar and/or a vector as a result of the processing. For example, the processor 210a may output the probability of about 76% that the input text string 310 is written in English, may output the probability about 23% that the input text string 310 is written in French, and may output the probability of about 1% that the input text string 310 is written in another language.

According to an embodiment, the processor 210a may convert the input text string 310 to the standard text string 410. The processor 210a may access a standard conversion table stored in the memory 220a. The processor 210a may convert the input text string 310 to the standard text string 410 based on an input-text-string language (e.g., the input-text-string language 330 in FIG. 3) and/or a standard conversion table.

According to an embodiment, the processor 210a may generate a standard conversion table based on one or more rules for converting a language in a specified notation. For example, the processor 210a may generate the standard conversion table based on a romanization rule or an international phonetic alphabet (IPA) rule. The processor 210a may store the generated standard conversion table in the memory 220a.

According to an embodiment, the processor 210a may convert the input text string 310 to the standard text string 410 based on the input-text-string language 330 and/or the standard conversion table. For example, when the input-text-string language 330 is Japanese and the standard conversion table is generated based on the romanization rule, the processor 210a may convert "フランチェスカ" to "Franchesuka" based on Japanese and the romanization rule.

According to an embodiment, the processor 210a may transmit the input text string 310, which is to be converted into the standard text string 410, to an external server (e.g., the server 108 in FIG. 1). The external server 108 may convert the received input text string 310 into the standard text string 410 through a language conversion module (e.g., a language conversion module 460 of FIG. 4B). The processor 210a may receive the standard text string 410 corresponding to the input text string 310 from the external server 108.

According to an embodiment, the processor 210a may transmit, to the external server 108, a signal for requesting download of at least one language conversion module (e.g., a first language conversion module 265 in FIG. 4C) among language conversion modules (e.g., a language conversion module 460 in FIG. 4C) stored in the external server 108. The external server 108 may transmit the first language conversion module 265 to the electronic device 200a in response to a signal received from the processor 210a. The processor 210a may convert the input text string 310 into the standard text string 410 based on the first language conversion module 265.

According to an embodiment, the processor 210a may convert the standard text string 410 into the code string 510. The processor 210a may access the code conversion table stored in the memory 220a. The processor 210a may convert the standard text string 410 into a code string (e.g., the code string 510 of FIG. 5) based on the code conversion table. For example, the processor 210a may convert the standard text string 410 of "Furanchesuka" to the code string 510 of "106052002020".

According to an embodiment, the processor 210a may classify characters having similar pronunciation into a plurality of groups and may generate the code conversion table by setting a code corresponding to each group. The processor 210a may refer to a rule for generating the standard conversion table in a process of generating the code conversion table. For example, when the processor 210a generates a standard conversion table based on the romanization rule, the processor 210a may generate the code conversion table based on Roman characters having similar pronunciations.

According to an embodiment, the processor 210a may generate a vector string such as the plurality of first vectors 610 based on the code string 510. The processor 210a may generate the plurality of first vectors 610 based on the order (e.g., a code order of a forward-ordered code string or a code order of a reverse-ordered code string) of codes included in the code string 510 and two consecutive codes.

According to an embodiment, the processor 210a may generate the plurality of first vectors 610 based on a bigram method.

According to an embodiment, the processor 210a may generate the plurality of first vectors 610 based on a unigram method and/or a trigram method.

According to an embodiment, the order of codes may indicate the order of a code included in the code string 510 from a start code (e.g., a start code of a forward-ordered code string or a start code of a reverse-order code string) of the code string 510. For convenience of description, the order of the start code of the code string 510 is set to be a 0th order. For example, when the code string 510 is "106052002020", "1" may correspond to the 0th order. "0" following "1" may correspond to the first order. "6" may correspond to the second order.

According to an embodiment, the two consecutive codes may indicate one code included in the code string 510 and a code following the one code. For example, the code string 510 of "106052002020" may include two consecutive codes such as "10", "06", "60", "05", "52", or "20".

According to an embodiment, the processor 210a may generate the plurality of first vectors 610 based on the order of codes and the two consecutive codes. For example, when the code string 510 is "106052002020", the processor 210a may generate the plurality of first vectors 610 including [[0,1,0], [1,0,6], [2,6,0], [3,0,5], [4,5,2], [5,2,0] [6,0,0], [7,0,2], [8,2,0], [9,0,2], and [10,2,0]].

According to an embodiment, the processor 210a may compare the plurality of first vectors 610 with a plurality of index vectors stored in the index 230. The processor 210a may determine a similarity between the two vectors by comparing the plurality of first vectors 610 with the plurality of index vectors. A method of the processor 210a determining the similarity between two vectors may include a plurality of operations. Specific details of the plurality of operations will be described below.

According to an embodiment, when two vectors (e.g., the plurality of first vectors 610 and the plurality of index vectors) have different lengths from each other, the processor 210a may normalize the lengths of the two vectors. The processor 210a may compare patterns and/or slopes of the two vectors whose lengths are normalized. When the similarity between the two vectors whose lengths are normalized is greater than or equal to a threshold, the processor 210a may determine that the two vectors are similar to each other. For example, the threshold may be a value preset in a system or a value set by the user.

According to an embodiment, the processor 210a may determine the similarity between two arbitrary vectors based on a cosine similarity method. For example, the processor 210a may determine a similarity between the plurality of first vectors 610 and the plurality of index vectors based on the cosine similarity method.

According to an embodiment, the processor 210a may identify a plurality of second vectors, which are similar to the plurality of first vectors 610, from among the plurality of index vectors. The processor 210a may search for an output text string corresponding to the plurality of second vectors in the index 230. The output text string may be a text string, which is pronounced identically and/or similarly to the input text string 310 and which is written in a language different from a language in which the input text string 310 is written.

According to an embodiment, the processor 210a may return the output text string to the user.

FIG. 2B is a block diagram illustrating components included in an electronic device disclosed in the specification.

Referring to FIG. 2B, an electronic device 200b (e.g., the electronic device 101 of FIG. 1) may include an application 210, a search engine 220, and/or the index 230.

According to an embodiment, the application 210 may receive a query from a user. The query may include a text string (hereinafter, referred to as an 'input text string') entered by the user. The query may include a search request for a text string, which is written in a language different from that of the input text string 310, from among text strings, each of which is pronounced identically or similarly to an input text string (e.g., the input text string 310 of FIG. 3). For example, the input text string 310 may include a word, a phrase, a clause, and/or a sentence.

According to an embodiment, the search engine 220 may include a query generation module 221, an analysis module 240, a searching module 290, an index generation module 223, and/or a data collection module 225. According to an embodiment, the analysis module 240 may include a language identification module 250, a language conversion module 260, a code conversion module 270, and/or a vector generation module 280.

According to an embodiment, the index 230 may include a plurality of text strings. The index 230 may store the plurality of text strings written based on the same language and/or different languages. For example, the index 230 may include a text string stored based on French, a text string stored based on Korean, a text string stored based on Japanese, and/or a text string saved based on English. The index 230 may include a plurality of vectors (hereinafter, referred to as "a plurality of index vectors") respectively corresponding to the plurality of text strings.

According to an embodiment, the data collection module 225 may collect data for generating the index 230 from the memory 220a. For example, the data collection module 225 may collect at least one of contact data, image data, video data, application data, document data, and/or other data as data for generating the index 230 from the electronic device 200b.

According to an embodiment, the index generation module 223 may generate the index 230 based on data for generating the index 230. The index generation module 223 may include data for generating the index 230 in the generated index 230. The index generation module 223 may include a text string extracted from the data for generating the index 230, and a vector corresponding to the text string in the index 230.

According to an embodiment, the application 210 may receive a query from a user. For example, the query may include the input text string 310. The query may include a search request for a text string, which is written in a language different from that of the input text string 310, from among text strings, each of which is pronounced identically or similarly to an input text string 310.

For example, when the user enters "Francesca", the query may include a search request for a text string written in a language other than 'Korean' among text strings having identical or similar pronunciation to the pronunciation of "Francesca".

According to an embodiment, the application 210 may transmit the received query to the search engine 220.

According to an embodiment, the query generation module 221 may generate a formatted query based on the query received from the application 210. The formatted query may be a query having a format that allows the search engine 220 to perform a series of operations based on the query. For example, the series of operations may include an operation in which the search engine 220 uses, processes, modifies, translates and/or deletes a query.

According to an embodiment, together with the analysis module 240, the searching module 290 may search for the index 230 based on the formatted query. The formatted query may include the input text string 310.

According to an embodiment, the analysis module 240 may generate a vector corresponding to the input text string 310 based on the input text string 310. The vector corresponding to the input text string 310 may be referred to as "a plurality of first vectors" (e.g., the plurality of first vectors 610 in FIG. 6) below.

According to an embodiment, the searching module 290 may compare the plurality of first vectors with a plurality of index vectors included in the index 230. The searching module 290 may determine a similarity between the two vectors by comparing the plurality of first vectors 610 with the plurality of index vectors.

According to an embodiment, a method of the searching module 290 determining the similarity between two arbitrary vectors may include a plurality of operations. In an embodiment, when lengths of two arbitrary vectors are different from each other, the searching module 290 may normalize the lengths of the two vectors. The searching module 290 may compare patterns and/or slopes of the two vectors whose lengths are normalized. In an embodiment, when the similarity between the two vectors whose lengths are normalized is greater than or equal to a threshold, the searching module 290 may determine that the two vectors are similar to each other. For example, the threshold may be a value preset in a system or a value set by the user.

According to an embodiment, the searching module 290 may determine the similarity between two arbitrary vectors based on a cosine similarity method. For example, the searching module 290 may determine a similarity between the plurality of first vectors 610 and the plurality of index vectors based on the cosine similarity method.

According to an embodiment, the searching module 290 may identify a plurality of second vectors, which are similar to the plurality of first vectors 610, from among the plurality of index vectors. The searching module 290 may search for an output text string corresponding to the plurality of second vectors in the index 230. The searching module 290 may return the output text string to the application 210. The output text string may be a text string, which is pronounced identically and/or similarly to the input text string 310 and which is written in a language different from a language in which the input text string 310 is written.

According to an embodiment, the data collection module 225 may collect data for generating the index 230 from the electronic device 200b. The index generation module 223 may generate the index 230 based on the data for generating the index 230. The application 210 may receive a query from a user. The search engine 220 may search for information corresponding to the received query in the index 230. The search engine 220 may transmit a result value (e.g., an output text string) found in the index 230 to the application 210. The application 210 may return the output text string received from the search engine 220 to the user.

Figure 3:
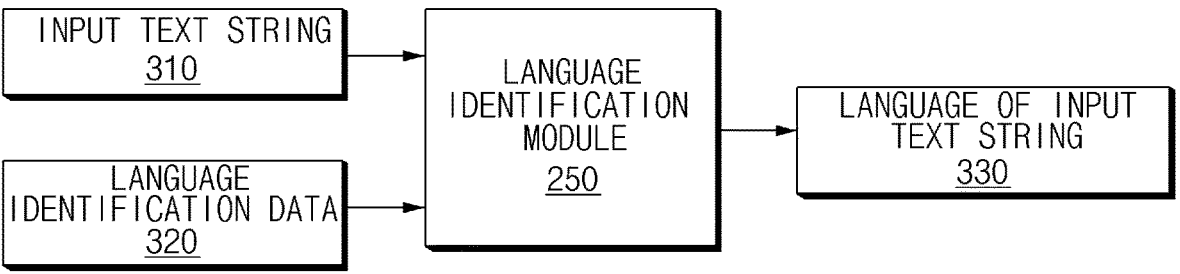
FIG. 3 is a block diagram illustrating a language identification module disclosed in the specification.

FIG. 3 is a block diagram illustrating the language identification module 250 disclosed in the specification.

Referring to FIG. 3, the language identification module 250 may identify the input-text-string language 330 (e.g., a language in which the input text string 310 is written) based on the input text string 310 (e.g., the input text string of FIG. 2A) and the language identification data 320. An input of the language identification module 250 may include an input text vector corresponding to the input text string 310 and a language identification vector corresponding to the language identification data 320. An output of the language identification module 250 may include the probability corresponding to the input-text-string language 330 in a form of a scalar and/or a vector.

According to an embodiment, the language identification module 250 may identify a plurality of input text strings (e.g., a first input text string and a second input text string) for a plurality of languages (e.g., a first language and a second language) using the same character system (e.g., Roman characters) to correspond to respective meanings, by identifying the input-text-string language 330 based on the language identification data 320. For example, when it is difficult for the language identification module 250 to identify the input-text-string language 330 with only the content of the input text string 310 such as 'one word', and/or 'phrase', the language identification module 250 may identify the input-text-string language 330 based on the language identification data 320.

For example, in English and French using the same Romanization system, the language identification module 250 may identify the input-text-string language 330 based on the language identification data 320, and thus the language identification module 250 may identify "car" written in French as the meaning of "because" and may identify "car" written in English as the meaning of "car".

According to an embodiment, the language identification data 320 may include at least one of a unicode of the input text string 310, a language used by the electronic device 101, a setting country of the electronic device 101, or location information of the electronic device 101.

According to an embodiment, the unicode may refer to a way to standardize characters for computational processing. The language used by the electronic device 101 may indicate a language recognized by the user through the electronic device 101. The language used by the electronic device 101 is preset in a system or may be set separately by a user. The setting country of the electronic device 101 may be set based on a country or region where the user employs the electronic device 101. The location information of the electronic device 101 may be set based on communication of the electronic device 101 and GPS.

According to an embodiment, the language identification module 250 may generate an input text vector by converting the input text string 310 into a vector through a one hot encoding scheme. The one hot encoding scheme is a well-known method for expressing characters as vectors, and thus detailed descriptions are omitted in this specification.

For example, when the input text string 310 is "car", the language identification module 250 may generate an input text vector as shown in Table 1 below by converting the input text string 310 into a vector through the hot encoding scheme.

TABLE 1

|  | C | A | R |
|---|---|---|---|
| A | 0 | 1 | 0 |
| B | 0 | 0 | 0 |
| C | 1 | 0 | 0 |
| . . . | . . . | . . . | . . . |
| R | 0 | 0 | 1 |
| . . . | . . . 0 | 0 . . . 1 | . . . |
| Z | 0 | 0 | 0 |

According to an embodiment, the language identification module 250 may generate a language identification vector by converting content included in the language identification data 320 into a vector. When the language identification data 320 includes pieces of content, the language identification module 250 may generate a plurality of language identification vectors by converting each of the pieces of content into a vector. For example, when the language identification data 320 includes a language (e.g., English (EN)) used by the electronic device 101, and the setting country (e.g., United States (US)) of the electronic device 101, the language identification module 250 may generate a first language identification vector obtained by converting the language used of the electronic device 101 into a vector as shown in Table 2 below, and may generate a second language identification vector obtained by converting the setting country of the electronic device 101 into a vector as shown in Table 3 below.

TABLE 2

| EN | 1 |
|---|---|
| FR | 0 |
| SP | 0 |
| PT | 0 |
| IT | 0 |
| NE | 0 |

TABLE 3

| US | 1 |
|---|---|
| BR | 0 |
| KO | 0 |
| CN | 0 |
| JP | 0 |
| AU | 0 |

According to an embodiment, the language identification module 250 may process an input value (e.g., the input text string 310 and/or the language identification data 320) based on a CNN algorithm, a RNN algorithm, or a FNN algorithm. Because the CNN algorithm, the RNN algorithm, and the FNN algorithm are already known algorithms, a detailed description thereof will be omitted.

According to an embodiment, the input-text-string language may indicate a language in which the input text string 310 is written. The language identification module 250 may output the input-text-string language 330 in the form (e.g., a scalar and/or vector) of a probability corresponding to a language. For example, the language identification module 250 may output a probability of about 76% that the input text string 310 is written in English, may output a probability about 23% that the input text string 310 is written in French, and may output a probability of about 1% that the input text string 310 is written in another language.

Figure 4A:
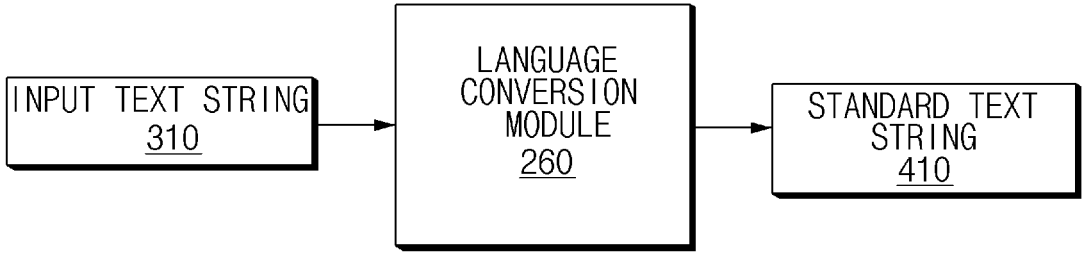
FIG. 4A is a block diagram illustrating a language conversion module disclosed in the specification.

FIG. 4A is a block diagram illustrating the language conversion module 260 disclosed in the specification.

Referring to FIG. 4A, the language conversion module 260 may convert the input text string 310 into the standard text string 410. The language conversion module 260 may access a standard conversion table included in a memory (e.g., the memory 220*a* of FIG. 2A). The language conversion module 260 may convert the input text string 310 to the standard text string 410 based on an input-text-string language (e.g., the input-text-string language 330 in FIG. 3) and a standard conversion table.

According to an embodiment, the language conversion module 260 may generate a standard conversion table based on one or more rules for converting a language in a specified notation. For example, the language conversion module 260 may generate the standard conversion table based on a romanization rule or an IPA rule. The romanization rule or IPA rule is only an example of a method for generating the standard conversion table. For example, the method for generating the standard conversion table is not limited to the above-described example.

According to an embodiment, the language conversion module 260 may convert the input text string 310 to the standard text string 410 based on the input-text-string language 330 and the standard conversion table.

For example, when the input-text-string language 330 is Japanese and the standard conversion table is generated based on the romanization rule, the language conversion module 260 may convert "フランチェスカ" to "Franchesuka" based on Japanese and the romanization rule. "フランチェスカ" may indicate the input text string 310 entered by the user into the electronic device 101 in Japanese. "Furanchesuka" may indicate the standard text string 410 obtained by converting Japanese "フランチェスカ" by the language conversion module 260.

Figure 4B:
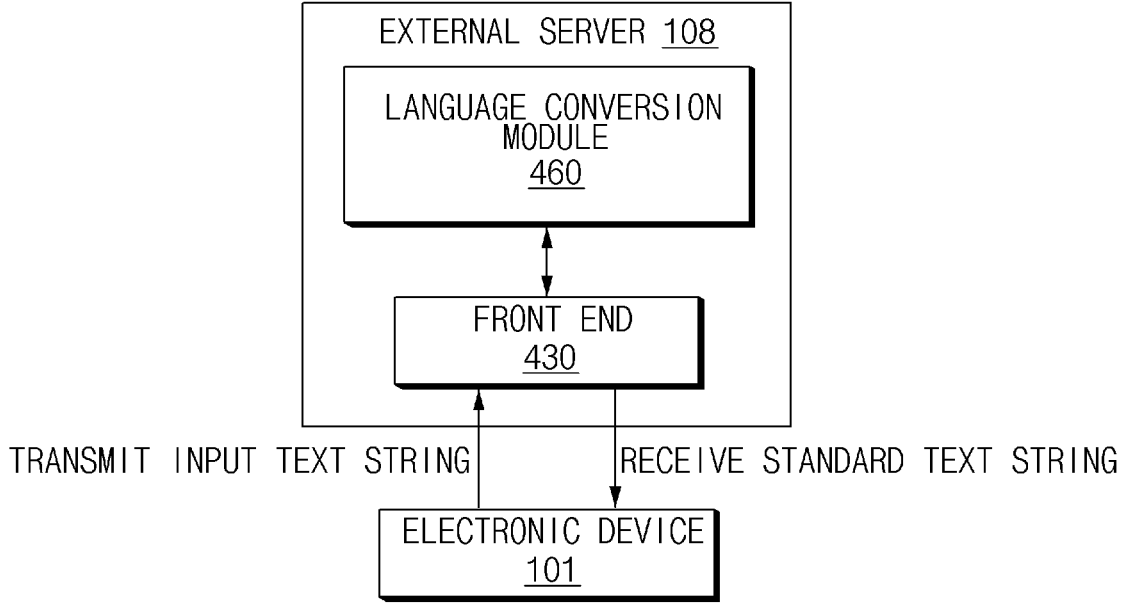
FIG. 4B is a block diagram illustrating a language conversion module disclosed in the specification.

FIG. 4B is a block diagram illustrating the language conversion module 460 disclosed in the specification.

Referring to FIG. 4B, the external server 108 may include at least one language conversion module 460. The language conversion module 460 may perform an operation substantially the same as or similar to that of the language conversion module 260 of FIG. 2B. The external server 108 may communicate with the electronic device 101 through a front end 430. The external server 108 may include the language conversion module 460 generated based on an input-text-string language (e.g., the input-text-string language 330 in FIG. 3) and a standard conversion table.

For example, the external server 108 may include the language conversion module 460 generated based on English and a romanization rule. As another example, the external server 108 may include the language conversion module 460 generated based on Russian and the romanization rule. As another example, the external server 108 may include the language conversion module 460 generated based on Korean and an IPA rule.

According to an embodiment, the electronic device 101 (e.g., the electronic device 200a of FIG. 2A) may not include a language conversion module (e.g., the language conversion module 260 of FIG. 2B). The electronic device 101 may transmit an input text string (e.g., the input text string 310 of FIG. 3) to be converted into a standard text string (e.g., the standard text string 410 of FIG. 4A) to the external server 108. The front end 430 of the external server 108 may receive the input text string 310 from the electronic device 101 and may transmit the input text string 310 to the language conversion module 460. The language conversion module 460 included in the external server 108 may receive the input text string 310 from the front end 430, may convert the input text string 310 to the standard text string 410, and may transmit the standard text string 410 to the front end 430. The front end 430 may transmit the standard text string 410 received from the language conversion module 460 to the electronic device 101. In an embodiment, even when the electronic device 101 includes at least one language conversion module in the memory (e.g., the memory 220a in FIG. 2A), the electronic device 101 may convert the input text string 310 into the standard text string 410 by using the language conversion module 460 included in the external server 108.

According to an embodiment, the electronic device 101 may transmit the input text string 310 to the external server 108. The external server 108 may receive the input text string 310 from the electronic device 101 through the front end 430. The external server 108 may convert the received input text string 310 into the standard text string 410 through the language conversion module 460 of FIG. 4B. The external server 108 may transmit the standard text string 410 to the electronic device 101 through the front end 430. The electronic device 101 may receive the standard text string 410 from the external server 108.

For example, the electronic device 101 may transmit the input text string 310 of "フランチェスカ" to the external server 108. The external server 108 may receive the input text string 310 of "フランチェスカ" from the electronic device 101 through the front end 430. The external server 108 may convert the received input text string 310 of "フランチェスカ" into the standard text string 410 of "Furanchesuka" through the language conversion module 460 (e.g., a language conversion module generated based on Japanese and the romanization rule). The external server 108 may transmit the standard text string 410 of "Furanchesuka" to the electronic device 101 through the front end 430. The electronic device 101 may receive the standard text string 410 of "Furanchesuka" from the external server 108.

Figure 4C:
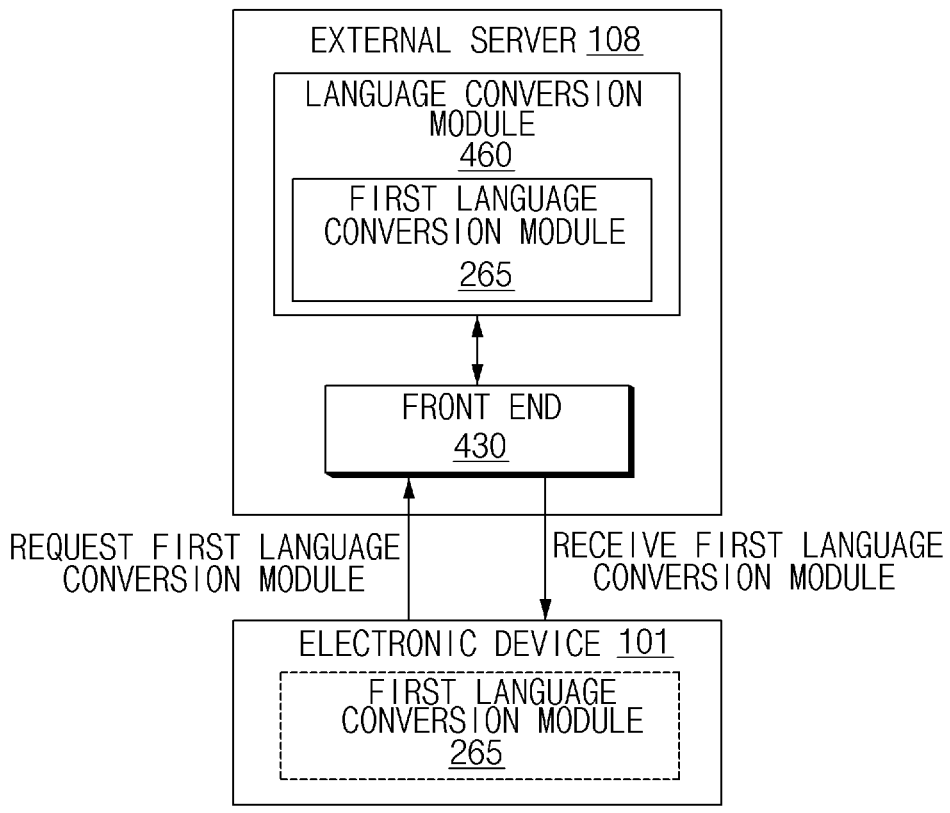
FIG. 4C is a block diagram illustrating a language conversion module disclosed in the specification.

FIG. 4C is a block diagram illustrating the language conversion module 460 disclosed in the specification. For convenience of description, descriptions the same as descriptions given with reference to FIG. 4B will be omitted.

Referring to FIG. 4C, the electronic device 101 may download at least one of the language conversion module 460 included in the external server 108 from the external server 108. At least one language conversion module that is to be downloaded by the electronic device 101 from the external server 108 is referred to as a "first language conversion module" 265.

According to an embodiment, the electronic device 101 may transmit a signal for requesting the download of the first language conversion module 265 to the front end 430 of the external server 108. The front end 430 of the external server 108 may receive a signal for requesting the download of the first language conversion module 265 from the electronic device 101. The front end 430 may transmit the first language conversion module 265 to the electronic device 101 in response to a signal received from the electronic device 101. The electronic device 101 may download the first language conversion module 265 from the front end 430.

In an embodiment, the first language conversion module 265 may convert the input text string 310 into the standard text string 410. For example, the electronic device 101 may transmit the signal for requesting the download of the first language conversion module 265 (e.g., a language conversion module generated based on Japanese and the romanization rule) to the front end 430 of the external server 108. The front end 430 of the external server 108 may receive a signal for requesting the download of the first language conversion module 265 from the electronic device 101. The front end 430 may transmit the first language conversion module 265 to the electronic device 101 in response to a signal received from the electronic device 101. The electronic device 101 may download the first language conversion module 265 from the front end 430. For example, the first language conversion module 265 may convert the input text string 310 of "フランチェスカ" into the standard text string 410 of "Franchesuka".

Figure 5:
FIG. 5 is a block diagram illustrating a code conversion module disclosed in the specification.

FIG. 5 is a block diagram illustrating the code conversion module 270 disclosed in the specification.

According to an embodiment, the code conversion module 270 may convert the standard text string 410 into the code string 510. The code conversion module 270 may access a code conversion table included in a memory (e.g., the memory 220a of FIG. 2A). The code conversion module 270 may convert the standard text string 410 into the code string 510 based on the code conversion table. For example, the code conversion module 270 may convert the standard text string 410 of "Furanchesuka" to the code string 510 of "106052002020".

According to an embodiment, the code conversion module 270 may classify characters having similar pronunciation into a plurality of groups and may generate the code conversion table by setting a code corresponding to each group. In an embodiment, in a process of generating the code conversion table, the code conversion module 270 may refer to a rule in which a language conversion module (e.g., the language conversion module 260 of FIG. 4A, the language conversion module 460 of FIG. 4B, or the first language conversion module 265 of FIG. 4C) generates a standard conversion table.

For example, when the language conversion module generates a standard conversion table based on the romanization rule, the code conversion module 270 may generate the code conversion table, as shown in Table 4 below, based on Roman characters having similar pronunciations.

TABLE 4

| Roman characters | Setting code |
| --- | --- |
| a, e, i, o, u, w, h, y | 0 |
| b, f, p, v | 1 |
| c, g, j, k, q, s, x, z | 2 |
| d, t | 3 |
| L | 4 |
| m, n | 5 |
| R | 6 |

Figure 6:
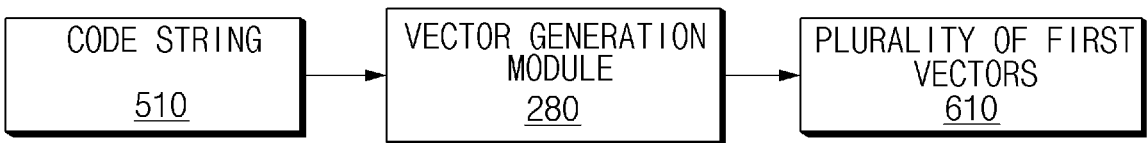
FIG. 6 is a block diagram illustrating a vector generation module disclosed in the specification.

FIG. 6 is a block diagram illustrating the vector generation module 280 disclosed in the specification.

Referring to FIG. 6, the vector generation module 280 may generate a vector string such as the plurality of first vectors 610 based on the code string 510. The vector generation module 280 may receive the code string 510 and then may output the plurality of first vectors 610. A detailed method of the vector generation module 280 generating the plurality of first vectors 610 is described below.

According to an embodiment, the vector generation module 280 may generate the plurality of first vectors 610 based on the order of codes included in the code string 510, and two consecutive codes. According to an embodiment, the vector generation module 280 may generate the plurality of first vectors 610 based on a bigram method. Through an event that the vector generation module 280 generates the plurality of first vectors 610 based on a bigram method, the vector generation module 280 may include information about a change in pronunciation of the input text string (e.g., the input text string 310 of FIG. 3) in the plurality of first vectors 610.

According to an embodiment, the order of codes may indicate the order of a code included in the code string 510 from a start code of the code string 510. For convenience of description, the order of the start code of the code string 510 is set to be a 0th order. For example, when the code string 510 is "106052002020", "1" may correspond to the 0th order. "0" following "1" may correspond to the first order. "6" may correspond to the second order.

According to an embodiment, the two consecutive codes may indicate one code included in the code string 510 and a code following the one code. For example, the code string 510 of "106052002020" may include two consecutive codes such as "10", "06", "60", "05", "52", or "20".

According to an embodiment, the vector generation module 280 may generate the plurality of first vectors 610 based on the order of codes and the two consecutive codes. For example, when the code string 510 is "106052002020", the vector generation module 280 may generate the plurality of first vectors 610 including vectors shown in Table 5 below. For example, the vector generation module 280 may generate the plurality of first vectors 610 including [[0,1,0], [1,0,6], [2,6,0], [3,0,5], [4,5,2], [5,2,0] [6,0,0], [7,0,2], [8,2, 0], [9,0,2], and [10,2,0]].

TABLE 5

| Order of codes | Two consecutive codes | Vector |
|---|---|---|
| 0 | 10 | [0, 1, 0] |
| 1 | 06 | [1, 0, 6] |
| 2 | 60 | [2, 6, 0] |
| 3 | 05 | [3, 0, 5] |
| 4 | 52 | [4, 5, 2] |
| 5 | 20 | [5, 2, 0] |
| 6 | 00 | [6, 0, 0] |
| 7 | 02 | [7, 0, 2] |
| 8 | 20 | [8, 2, 0] |
| 9 | 02 | [9, 0, 2] |
| 10 | 20 | [10, 2, 0] |

FIG. 7 is a flowchart for performing an indexing operation, according to an embodiment disclosed in the specification.

Referring to FIG. 7, in operation 710, a data collection module (e.g., the data collection module 225 of FIG. 2B) may collect data for generating an index (e.g., the index 230 of FIG. 2B) from an electronic device (e.g., the electronic device 101 of FIG. 1, the electronic device 200a of FIG. 2A, or the electronic device 200b of FIG. 2B). For example, the data collection module 225 may collect at least one of contact data, image data, video data, application data, document data, or other data from the electronic device 101. The data collection module 225 may transmit text data (e.g., the input text string 310 of FIG. 3) included in the data collected from the electronic device 101 to a language identification module (e.g., the language identification module 250 of FIG. 2B).

According to an embodiment, in operation 720, the language identification module 250 may identify an input-text-string language (e.g., the input-text-string language 330 of FIG. 3) based on the input text string 310 and language identification data (e.g., the language identification data 320 of FIG. 3). For example, when the input text string 310 is " Франческа " and a setting country of the electronic device 101 is Russia, the language identification module 250 may identify the input-text-string language 330 as Russian. The language identification module 250 may transmit the identified input-text-string language 330 to a language conversion module (e.g., the language conversion module 260 of FIG. 2B, the language conversion module 460 of FIG. 4B, or the first language conversion module 265 of FIG. 4C).

According to an embodiment, in operation 730, the language conversion module may convert the input text string 310 into a standard text string (e.g., the standard text string 410 of FIG. 4A). The language conversion module may convert the input text string 310 to the standard text string 410 based on the input-text-string language 330, and a standard conversion table (e.g., the standard conversion table of FIG. 4A). For example, when the input text string 310 is Russian and the standard conversion table is generated based on the romanization rule, the language conversion module may convert the input text string 310 of " Франческа " to the standard text string 410 of "Francheska". The language conversion module may transmit the standard text string 410 to the code conversion module 270.

According to an embodiment, in operation 740, the code conversion module 270 may convert the standard text string 410 into a code string (e.g., the code string 510 of FIG. 5). The code conversion module 270 may convert the standard text string 410 to the code string 510 based on the code conversion table (e.g., the code conversion table in Table 4). For example, when the standard text string 410 is "Francheska" and the code conversion table is generated based on the romanization rule, the code conversion module 270 may convert the standard text string 410 of "Francheska" to the code string 510 of "1605200220". The code conversion module 270 may transmit the code string 510 to the vector generation module 280.

According to an embodiment, in operation 750, the vector generation module 280 may generate a vector string based on the code string 510. The vector generation module 280 may generate the vector string based on the order of codes included in the code string 510 and two consecutive codes. For example, when the code string 510 is "1605200220", the vector generation module 280 may generate a vector string of [[0,1,6], [1,6,0], [2,0,5], [3,5,2], [4,2,0], [5,0,0], [6,0,2], [7,2,2], and [8,2,0]]. The vector generation module 280 may transmit the vector string to the index generation module 223.

According to an embodiment, in operation 760, the index generation module 223 may include a text string and a vector string corresponding to the text string in the index 230. For example, the index generation module 223 may include a text string of "Франческа " and a vector string of [[0,1,6], [1,6,0], [2,0,5], [3,5,2], [4,2,0], [5,0,0], [6,0,2], [7,2,2], and

[8,2,0]] corresponding to "Франческа ". The vector string corresponding to the text string is hereinafter referred to as a "plurality of index vectors".

FIG. 8 is a flowchart for performing a querying operation, according to an embodiment disclosed in the specification.

Referring to FIG. 8, in operation 810, an application (e.g., the application 210 of FIG. 2B) may receive a query (e.g., the query of FIG. 2B) from a user. The query may include a text string (e.g., an input text string 310 of FIG. 3) entered by the user. The query may include a search request for a text string, which is written in a language different from that of the input text string 310, from among text strings, each of which is pronounced identically or similarly to the input text string 310. For example, when the user enters a text of " フランチェスカ" into an electronic device (e.g., the electronic device 101 of FIG. 1, the electronic device 200a of FIG. 2A, or the electronic device 200b of FIG. 2B), the query may include a search request for a text string, which is written in a language different from that of " フランチェスカ", among text strings pronounced identically or similarly to the pronunciation of " フランチェスカ"

According to an embodiment, in operation 820, a language identification module (e.g., the language identification module 250 in FIG. 2B) may identify an input-text-string language (e.g., the input-text-string language 330 of FIG. 3) based on the input text string 310 and language identification data (e.g., the language identification data 320 of FIG. 3). For example, when the input text string 310 is " フランチェスカ" and a setting country of the electronic device 101 is Japan, the language identification module 250 may identify the input-text-string language 330 as Japanese. The language identification module 250 may transmit the input-text-string language 330 to a language conversion module (e.g., the language conversion module 260 of FIG. 2B, the language conversion module 460 of FIG. 4B, or the first language conversion module 265 of FIG. 4C).

According to an embodiment, in operation 830, the language conversion module may convert the input text string 310 into a standard text string (e.g., the standard text string 410 of FIG. 4A). The language conversion module may convert the input text string 310 to the standard text string 410 based on the input-text-string language 330 and a standard conversion table (e.g., the standard conversion table of FIG. 4A). For example, when the input text string 310 is Japanese and the standard conversion table is generated based on the romanization rule, the language conversion module may convert the input text string 310 of " フランチェスカ" to the standard text string 410 of "Furanchesuka". The language conversion module may transmit the standard text string 410 to a code conversion module (e.g., the code conversion module 270 of FIG. 2B).

According to an embodiment, in operation 840, the code conversion module 270 may convert the standard text string 410 into a code string (e.g., the code string 510 of FIG. 5). The code conversion module 270 may convert the standard text string 410 to the code string 510 based on the code conversion table (e.g., the code conversion table in Table 4). For example, when the standard text string 410 is "Furanchesuka" and the code conversion table is generated based on the romanization rule, the code conversion module 270 may convert the standard text string 410 of "Furanchesuka" to the code string 510 of "106052002020". The code conversion module 270 may transmit the code string 510 to the vector generation module 280.

According to an embodiment, in operation 850, the vector generation module 280 may generate a vector string (e.g., the plurality of first vectors 610 in FIG. 6) based on the code string 510. The vector generation module 280 may generate the plurality of first vectors 610 based on the order of codes included in the code string 510, and two consecutive codes. For example, when the code string 510 is "106052002020", the vector generation module 280 may generate the plurality of first vectors 610 of [[0,1,0], [1,0,6], [2,6,0], [3,0,5], [4,5,2], [5,2,0] [6,0,0], [7,0,2], [8,2,0], [9,0,2], and [10,2,0]]. The vector generation module 280 may transmit the plurality of first vectors 610 to a searching module (e.g., the searching module 290 of FIG. 2B).

According to an embodiment, in operation 860, the searching module 290 may compare a vector string (e.g., the plurality of first vectors 610 in FIG. 6) with a plurality of index vectors (e.g., the plurality of index vectors in FIG. 7) included in an index (e.g., the index 230 of FIG. 2B). The searching module 290 may compare the plurality of first vectors 610 with the plurality of index vectors based on a method of determining a similarity between two vectors. When the similarity between two vectors is greater than or equal to a threshold, the searching module 290 may determine that the two vectors are similar to each other. Alternatively, when the similarity between the two vectors is less than the threshold, the searching module 290 may determine that two vectors are different from each other.

For example, when the similarity between the plurality of first vectors (e.g., [[0,1,0], [1,0,6], [2,6,0], [3,0,5], [4,5,2], [5,2,0] [6,0,0], [7,0,2], [8,2,0], [9,0,2], and [10,2,0]]) and the plurality of index vectors (e.g., [[1,6,0], [2,0,5], [3,5,2], [4,2,0], [5,0,0], [6,0,2], [7,2,2], and [8,2,0]]) is greater than the threshold, the searching module 290 may determine that the two vectors are similar to each other. As another example, when the similarity between the plurality of first vectors and the plurality of index vectors is less than the threshold, the searching module 290 may determine that the two vectors are different from each other.

According to an embodiment, in operation 870, the searching module 290 may identify a plurality of second vectors, which are determined to be similar to the plurality of first vectors 610, from among the plurality of index vectors. The searching module 290 may search for an output text string (e.g., the output text string of FIG. 2A) corresponding to the plurality of second vectors in the index 230. The searching module 290 may return the output text string to the application 210. The output text string may be a text string, which is pronounced identically and/or similarly to the input text string 310 and which is written in a language different from a language in which the input text string 310 is written.

Even when a user does not know the language and meaning of a text (e.g., the output text string) to be found, the electronic device 101 (e.g., the electronic device 200a of FIG. 2A or the electronic device 200b of FIG. 2B) may search for the text (e.g., the output text string) by providing a method of searching for the output text string by using the pronunciation of the input text string 310 and the language of the corresponding pronunciation.

FIG. 9 is a flowchart for performing a method according to various embodiments disclosed in the specification.

Referring to FIG. 9, in operation 910, an electronic device (e.g., the electronic device 101 of FIG. 1) may receive an input text string (e.g., the input text string 310 of FIG. 3) from a user. The electronic device 101 may perform operation 910 through an application (e.g., the application 210 of FIG. 2B). In operation 910, the electronic device 101 may perform an operation substantially the same as or similar to an operation performed by the application 210 in operation 810.

In operation 920, the electronic device 101 may identify an input-text-string language (e.g., the input-text-string language 330 of FIG. 3). The electronic device 101 may perform operation 920 through a language identification module (e.g., the language identification module 250 of FIG. 2B). In operation 920, the electronic device 101 may perform an operation substantially the same as or similar to an operation performed by the language identification module 250 in operation 820.

In operation 930, the electronic device 101 may convert the input text string 310 into a standard text string (e.g., the standard text string 410 of FIG. 4A) based on the input-text-string language 330 and a standard conversion table. The electronic device 101 may perform operation 930 through a language conversion module (e.g., the language conversion module 260 of FIG. 2B, the language conversion module 460 of FIG. 4B, or the first language conversion module 265 of FIG. 4C). In operation 930, the electronic device 101 may perform an operation substantially the same as or similar to an operation performed by the language conversion module in operation 830.

In operation 940, the electronic device 101 may convert the standard text string 410 into a code string (e.g., the code string 510 of FIG. 5) based on the code conversion table. The electronic device 101 may perform operation 940 through a code conversion module (e.g., the code conversion module 270 of FIG. 2B). In operation 940, the electronic device 101 may perform an operation substantially the same as or similar to an operation performed by the code conversion module 270 in operation 840.

In operation 950, the electronic device 101 may generate a plurality of first vectors (e.g., the plurality of first vectors 610 in FIG. 6) based on the order of codes included in the code string 510 and two consecutive codes. The electronic device 101 may perform operation 950 through a vector generation module (e.g., the vector generation module 280 of FIG. 2B). In operation 950, the electronic device 101 may perform an operation substantially the same as or similar to an operation performed by the vector generation module 280 in operation 850.

In operation 960, the electronic device 101 may compare the plurality of first vectors 610 with a plurality of index vectors included in a memory (e.g., the memory 220a in FIG. 2A). The electronic device 101 may perform operation 960 through a searching module (e.g., the searching module 290 of FIG. 2B). In operation 960, the electronic device 101 may perform an operation substantially the same as or similar to an operation performed by the searching module 290 in operation 860.

In operation 970, the electronic device 101 may identify a plurality of second vectors having a similarity, which is equal to or greater than a threshold, with the plurality of first vectors 610 from among a plurality of index vectors. The electronic device 101 may perform operation 970 through the searching module 290. In operation 970, the electronic device 101 may perform an operation substantially the same as or similar to an operation performed by the searching module 290 in operation 870.

In operation 980, the electronic device 101 may provide a user with an output text string corresponding to a plurality of second vectors. The electronic device 101 may perform operation 980 through the application 210.

According to an embodiment disclosed in this specification, an electronic device may include a memory and a processor connected to the memory. The memory may store instructions that, when executed, cause the electronic device to receive an input text string from a user, to identify a language of the input text string, to convert the input text string into a standard text string based on the language of the input text string and a standard conversion table, to convert the standard text string into a code string based on a code conversion table, to generate a plurality of first vectors based on an order of codes included in the code string and two consecutive codes included in the code string, to compare the plurality of first vectors with a plurality of index vectors stored in the memory, to identify a plurality of second vectors having a similarity, which is greater than or equal to a threshold, with the plurality of first vectors from among the plurality of index vectors based on the comparison, and to provide the user with an output text string corresponding to the plurality of second vectors. The language of the input text string may be different from a language of the output text string. Pronunciation of the input text string may correspond to pronunciation of the output text string.

According to an embodiment disclosed in the specification, the instructions may cause the processor to identify the language of the input text string based on at least one of a unicode of the input text string, a setting language of the electronic device, a setting country of the electronic device, or location information of the electronic device.

According to an embodiment disclosed in the specification, the instructions may cause the processor to store the standard conversion table in the memory or an external server.

According to an embodiment disclosed in the specification, the instructions may cause the processor to transmit the input text string to the external server and to receive the standard text string, which is converted based on the input text string and a standard conversion table stored in the external server, from the external server.

According to an embodiment disclosed in the specification, the instructions may cause the processor to generate the standard conversion table based on a romanization rule or an international phonetic alphabet (IPA).

According to an embodiment disclosed in the specification, the instructions may cause the processor to generate the plurality of first vectors based on a first code included in the code string, a second code subsequent to the first code, and an order of the first code. The first code may sequentially correspond to a plurality of codes included in the code string.

According to an embodiment disclosed in the specification, the instructions may cause the processor to determine the similarity based on at least one of patterns of the plurality of first vectors, slopes of the plurality of first vectors, patterns of the plurality of index vectors, or slopes of the plurality of index vectors.

According to an embodiment disclosed in the specification, the instructions may cause the processor to determine the similarity based on a cosine similarity.

According to an embodiment disclosed in the specification, the instructions may cause the processor to receive media data from the user and to identify a text string, which is a vector conversion target, from among text strings included in the media data as the input text string.

According to an embodiment disclosed in the specification, the instructions may cause the processor to identify a language of an index text string received from the user or an external server, to convert the index text string into a standard index text string based on the language of the index text string and the standard conversion table, to convert the standard index text string into an index code string based on the code conversion table, and to generate the plurality of index vectors based on an order of index codes included in the index code string and two consecutive index codes included in the index code string.

According to an embodiment disclosed in this specification, a method of searching for a text in different languages based on pronunciation, performed by an electronic device, may include receiving an input text string from a user, identifying a language of the input text string, converting the input text string into a standard text string based on the language of the input text string and a standard conversion table, converting the standard text string into a code string based on a code translation table, generating a plurality of first vectors based on an order of codes included in the code string and two consecutive codes included in the code string, comparing the plurality of first vectors with a plurality of index vectors stored in a memory of the electronic device, identifying a plurality of second vectors having a similarity, which is greater than or equal to a threshold, with the plurality of first vectors from among the plurality of index vectors based on the comparison, and providing the user with an output text string corresponding to the plurality of second vectors. The language of the input text string may be different from a language of the output text string. Pronunciation of the input text string may correspond to pronunciation of the output text string.

According to an embodiment disclosed in this specification, the identifying of the language may include identifying the language of the input text string based on at least one of a unicode of the input text string, a setting language of an electronic device, a setting country of the electronic device, or location information of the electronic device.

According to an embodiment disclosed in this specification, the method of searching for the text in different languages based on the pronunciation may further include at least one of storing the standard conversion table in at least one of the memory or an external server.

According to an embodiment disclosed in this specification, the converting of the input text string into the standard text string may include transmitting the input text string to the external server and receiving the standard text string, which is converted based on the input text string and a standard conversion table stored in the external server, from the external server.

According to an embodiment disclosed in this specification, the method of searching for the text in different languages based on the pronunciation may further include generating the standard conversion table based on a romanization rule or an IPA.

According to an embodiment disclosed in this specification, the generating of the plurality of first vectors may include generating the plurality of first vectors based on a first code included in the code string, a second code subsequent to the first code, and an order of the first code. The first code sequentially may correspond to a plurality of codes included in the code string.

According to an embodiment disclosed in this specification, the method of searching for the text in different languages based on the pronunciation may further include determining the similarity based on at least one of patterns of the plurality of first vectors, slopes of the plurality of first vectors, patterns of the plurality of index vectors, or slopes of the plurality of index vectors.

According to an embodiment disclosed in this specification, the determining of the similarity may include determining the similarity based on a cosine similarity.

According to an embodiment disclosed in this specification, the receiving of the input text string may include receiving media data from the user and identifying a text string, which is a vector conversion target, from among text strings included in the media data as the input text string.

According to an embodiment disclosed in this specification, the method of searching for the text in different languages based on the pronunciation may further include identifying a language of an index text string received from the user or an external server, converting the index text string into a standard index text string based on the language of the index text string and the standard conversion table, converting the standard index text string into an index code string based on the code conversion table, and generating the plurality of index vectors based on an order of index codes included in the index code string and two consecutive index codes included in the index code.

According to an embodiment disclosed in this specification, a computer program product may be stored on a machine-readable storage medium including instructions that, when executed, cause a processor of an electronic device to identify a language of an input text string received from a user, to convert the input text string into a standard text string based on the language of the input text string and a standard conversion table, to convert the standard text string into a code string based on a code conversion table, to generate a plurality of first vectors based on an order of codes included in the code string and two consecutive codes included in the code string, to compare the plurality of first vectors with a plurality of index vectors stored in a memory of the electronic device, to identify a plurality of second vectors having a similarity, which is greater than or equal to a threshold, with the plurality of first vectors from among the plurality of index vectors based on the comparison, and to provide the user with an output text string corresponding to the plurality of second vectors. The language of the input text string may be different from a language of the output text string. Pronunciation of the input text string may correspond to pronunciation of the output text string.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a memory; and
a processor connected to the memory,
wherein the memory stores instructions that, when executed, cause the processor to:
collect a first input text string based on data stored in the electronic device;
convert the first input text string into a first standard text string based on language information set in the electronic device and a standard conversion table including a plurality of first texts generated based on a romanization rule or an international phonetic alphabet (IPA), wherein the converted first standard text string includes a plurality of second texts corresponding to the first input text string among the plurality of first texts;
convert the first standard text string into a first code string based on a code conversion table including a plurality of first codes corresponding to each of a plurality of groups in which texts having similar pronunciations among the plurality of first texts are classified, wherein the first code string includes a plurality of second codes corresponding to each of the plurality of second texts among the plurality of the first codes;
generate and store a plurality of index vectors based on two consecutive codes included in the first code string and an order of each of the two consecutive codes included in the first code string;
wherein the memory stores instructions that, when executed, further cause the processor to:
if a query including a second input text string which is written in a first language is received, convert the second input text string into a second standard text string based on the language information set in the electronic device and the standard conversion table, wherein the converted second standard text string includes a plurality of third texts corresponding to the second input text string among the plurality of first texts;
convert the second standard text string into a second code string based on the code conversion table, wherein the second code string includes a plurality of third codes corresponding to each of the plurality of third texts among the plurality of the first codes;
generate a plurality of first vectors based on two consecutive codes included in the second code string and an order of each of the two consecutive codes included in the second code string;
compare the plurality of first vectors with the plurality of index vectors stored in the electronic device;
identify a plurality of second vectors having a similarity, which is greater than or equal to a threshold, with the plurality of first vectors from among the plurality of index vectors based on the comparison; and
provide, as a response to the query, an output text string corresponding to the plurality of second vectors, wherein the output text string is written in a second language different from the first language, and
wherein pronunciation of the second input text string corresponds to pronunciation of the output text string.

2. The electronic device of claim 1, wherein the instructions cause the processor to:

identify the language information set in the electronic device based on at least one of a Unicode of the input text string, a setting language of the electronic device, a setting country of the electronic device, or location information of the electronic device.

3. The electronic device of claim 1, wherein the instructions cause the processor to:

store the standard conversion table in the memory or an external server.

4. The electronic device of claim 3, wherein the instructions cause the processor to:

transmit at least one of the first input text string and the second input text string to the external server; and receive at least one of the first standard text string and the second standard text string from the external server.

5. The electronic device of claim 1, wherein the instructions cause the processor to:

generate the plurality of first vectors based on a first code included in the code string, a second code subsequent to the first code, and an order of the first code, wherein the first code sequentially corresponds to a plurality of codes included in the code string.

6. The electronic device of claim 1, wherein the instructions cause the processor to:

determine the similarity based on at least one of patterns of the plurality of first vectors, slopes of the plurality of first vectors, patterns of the plurality of index vectors, or slopes of the plurality of index vectors.

7. The electronic device of claim 6, wherein the instructions cause the processor to:

determine the similarity based on a cosine similarity.

8. The electronic device of claim 1, wherein the instructions cause the processor to:

receive media data from a user; and identify a text string, which is a vector conversion target, from among text strings included in the media data as the input text string.

9. The electronic device of claim 1, wherein the instructions cause the processor to:

collect the first input text string based on at least one of contact data, image data, video data, application data or document data stored in the electronic device.

10. A method of searching for a text in different languages based on pronunciation, performed by an electronic device, the method comprising:

collecting a first input text string based on data stored in the electronic device;

converting the first input text string into a first standard text string based on language information set in the electronic device and a standard conversion table including a plurality of first texts generated based on a romanization rule or an international phonetic alphabet (IPA), wherein the converted first standard text string includes a plurality of second texts corresponding to the first input text string among the plurality of first texts;

converting the first standard text string into a first code string based on a code translation table including a plurality of first codes corresponding to each of a plurality of groups in which texts having similar pronunciations among the plurality of first texts are classified, wherein the first code string includes a plurality of second codes corresponding to each of the plurality of second texts among the plurality of the first codes;

generating and storing a plurality of index vectors based on two consecutive codes included in the first code string and an order of each of the two consecutive codes included in the first code string;

further comprising:

if a query including a second input text string which is written in a first language is received, converting the second input text string into a second standard text string based on the language information set in the electronic device and the standard conversion table, wherein the converted second standard text string includes a plurality of third texts corresponding to the second input text string among the plurality of first texts;

converting the second standard text string into a second code string based on the code conversion table, wherein the second code string includes a plurality of third codes corresponding to each of the plurality of third texts among the plurality of the first codes;

generating a plurality of first vectors based on two consecutive codes included in the second code string and an order of each of the two consecutive codes included in the second code string;

comparing the plurality of first vectors with the plurality of index vectors stored in the electronic device;

identifying a plurality of second vectors having a similarity, which is greater than or equal to a threshold, with the plurality of first vectors from among the plurality of index vectors based on the comparison; and providing, as a response to the query, an output text string corresponding to the plurality of second vectors, wherein the output text string is written in a second language different from the first language, and wherein pronunciation of the second input text string corresponds to pronunciation of the output text string.

11. The method of claim 10, wherein the identifying of the language includes:

identifying the language information set in the electronic device based on at least one of a Unicode of the input text string, a setting language of an electronic device, a setting country of the electronic device, or location information of the electronic device.

12. The method of claim 10, further comprising:

storing the standard conversion table in at least one of the memory or an external server.

13. The method of claim 12, wherein the converting of the input text string into the standard text string includes:

transmitting at least one of the first input text string and the second input text string to the external server; and receiving at least one of the first standard text string and the second standard text string from the external server.

14. The method of claim 10, wherein the generating of the plurality of first vectors includes:

generating the plurality of first vectors based on a first code included in the code string, a second code subsequent to the first code, and an order of the first code, wherein the first code sequentially corresponds to a plurality of codes included in the code string.

15. The method of claim 10, further comprising:

determining the similarity based on at least one of patterns of the plurality of first vectors, slopes of the plurality of first vectors, patterns of the plurality of index vectors, slopes of the plurality of index vectors, or a cosine similarity.

16. The method of claim 10, further comprising:

receiving media data from a user; and identifying a text string, which is a vector conversion target, from among text strings included in the media data as the input text string.

17. The method of claim 10, further comprising:

collecting the first input text string based on at least one of contact data, image data, video data, application data or document data stored in the electronic device.

18. A computer program product stored on a non-transitory machine-readable storage medium comprising instructions that, when executed, cause a processor of an electronic device to:

collect a first input text string based on data stored in the electronic device;

convert the first input text string into a first standard text string based on language information set in the electronic device and a standard conversion table including a plurality of first texts generated based on a romanization rule or an international phonetic alphabet (IPA), wherein the converted first standard text string includes a plurality of second texts corresponding to the first input text string among the plurality of first texts;

convert the first standard text string into a first code string based on a code conversion table including a plurality of first codes corresponding to each of a plurality of groups in which texts having similar pronunciations among the plurality of first texts are classified, wherein the first code string includes a plurality of second codes corresponding to each of the plurality of second texts among the plurality of the first codes;

generate and storing a plurality of index vectors based on two consecutive codes included in the first code string and an order of each of the two consecutive codes included in the first code string;

wherein the instructions that, when executed, further cause the processor of an electronic device to:

if a query including a second input text string which is written in a first language is received, convert the second input text string into a second standard text string based on the language information set in the electronic device and the standard conversion table, wherein the converted second standard text string includes a plurality of third texts corresponding to the second input text string among the plurality of first texts;

convert the second standard text string into a second code string based on the code conversion table, wherein the second code string includes a plurality of third codes corresponding to each of the plurality of third texts among the plurality of the first codes;

generate a plurality of first vectors based on two consecutive codes included in the second code string and an order of each of the two consecutive codes included in the second code string;

compare the plurality of first vectors with the plurality of index vectors stored in the electronic device;

identify a plurality of second vectors having a similarity, which is greater than or equal to a threshold, with the plurality of first vectors from among the plurality of index vectors based on the comparison; and provide, as a response to the query, an output text string corresponding to the plurality of second vectors, wherein the output text string is written in a second language different from the first language, and wherein pronunciation of the second input text string corresponds to pronunciation of the output text string.

* * * * *